US012609360B2

(12) United States Patent
Horibe et al.

(10) Patent No.: US 12,609,360 B2
(45) Date of Patent: *Apr. 21, 2026

(54) LARGE CAPACITY SOLID STATE BATTERY

(71) Applicant: INTERNATIONAL BUSINESS MACHINES CORPORATION, Armonk, NY (US)

(72) Inventors: Akihiro Horibe, Yokohama (JP); Kuniaki Sueoka, Sagamihara (JP); Takahito Watanabe, Yamato (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 534 days.

This patent is subject to a terminal disclaimer.

(21) Appl. No.: 18/159,881

(22) Filed: Jan. 26, 2023

(65) Prior Publication Data

US 2023/0170532 A1 Jun. 1, 2023

Related U.S. Application Data

(62) Division of application No. 15/673,819, filed on Aug. 10, 2017, now Pat. No. 11,637,325.

(51) Int. Cl.
H01M 10/0585 (2010.01)
H01M 10/04 (2006.01)
(Continued)

(52) U.S. Cl.
CPC ... H01M 10/0585 (2013.01); H01M 10/0436 (2013.01); H01M 10/052 (2013.01);
(Continued)

(58) Field of Classification Search
CPC ......... H01M 10/0585; H01M 10/0436; H01M 10/058; H01M 10/0562; H01M 10/0525;
(Continued)

(56) References Cited

U.S. PATENT DOCUMENTS 7,253,494 B2 8/2007 Mino et al.
9,368,722 B2 6/2016 Shih et al.
(Continued)

FOREIGN PATENT DOCUMENTS

CN 103947015 A 7/2014
CN 104396079 A 3/2015
(Continued)

OTHER PUBLICATIONS

Baggetto, L. et al., "3D negative electrode stacks for integrated all-solid-state lithium-ion microbatteries" Journal of Materials Chemistry (Mar. 2010) pp. 3703-3708, vol. 20.
(Continued)

*Primary Examiner* — Keith Walker
*Assistant Examiner* — Steven S Ha
(74) *Attorney, Agent, or Firm* — Tutunjian & Bitetto, P.C.; Robert Richard Aragona

(57) ABSTRACT

A technique relating to a battery structure is disclosed. A base substrate and a battery layer having a support substrate are prepared. The battery layer includes a protection layer formed on the support substrate, a film battery element formed on the protection layer and an insulator covering the film battery element. The battery layer is placed onto the base substrate with the bottom of the support substrate facing up. The support substrate is then removed from the battery layer at least in part by etching while protecting the film battery element by the protection layer. A stacked battery structure including the base substrate and the two or more battery layers is also disclosed.

20 Claims, 9 Drawing Sheets

(51) Int. Cl.

| | |
|---|---|
| *H01M 10/052* | (2010.01) |
| *H01M 10/0525* | (2010.01) |
| *H01M 10/058* | (2010.01) |
| *H01M 50/502* | (2021.01) |
| *H01M 50/51* | (2021.01) |
| *H01M 10/0562* | (2010.01) |

(52) U.S. Cl.

CPC ..... *H01M 10/0525* (2013.01); *H01M 10/058* (2013.01); *H01M 50/502* (2021.01); *H01M 50/51* (2021.01); *H01M 10/0562* (2013.01); *H01M 2220/30* (2013.01); *H01M 2300/0068* (2013.01)

(58) Field of Classification Search

CPC ..... H01M 2220/30; H01M 2300/0065; H01M 2300/0068; H01M 6/40

See application file for complete search history.

(56) References Cited

U.S. PATENT DOCUMENTS

| | | | |
|---|---|---|---|
| 9,634,334 B2 | 4/2017 | Ro et al. | |
| 9,680,177 B2 | 6/2017 | Iwamoto et al. | |
| 10,290,893 B2 | 5/2019 | Bedjaoui et al. | |
| 11,211,638 B2 | 12/2021 | Horibe et al. | |
| 2006/0113652 A1 | 6/2006 | Mino et al. | |
| 2008/0289676 A1 | 11/2008 | Guidotti et al. | |
| 2011/0117417 A1 | 5/2011 | Pitts | |
| 2012/0040223 A1 | 2/2012 | Odumodu | |
| 2012/0058380 A1 | 3/2012 | Wang et al. | |
| 2012/0321815 A1* | 12/2012 | Song | H01M 10/052 |
| | | | 427/555 |
| 2013/0164607 A1* | 6/2013 | Shih | H01M 10/052 |
| | | | 29/730 |
| 2014/0227609 A1* | 8/2014 | Frey | H01M 4/5825 |
| | | | 29/623.5 |
| 2015/0125731 A1 | 5/2015 | Ro et al. | |
| 2015/0325862 A1 | 11/2015 | Song et al. | |
| 2015/0333307 A1 | 11/2015 | Thokchom et al. | |

| | | | |
|---|---|---|---|
| 2015/0340727 A1 | 11/2015 | Iwamoto et al. | |
| 2016/0056129 A1* | 2/2016 | Horibe | H01L 21/308 |
| | | | 438/109 |
| 2016/0329538 A1 | 11/2016 | Hughes | |
| 2017/0033365 A1 | 2/2017 | Bhardwaj | |
| 2017/0104195 A1 | 4/2017 | Bedjaoui et al. | |
| 2019/0165342 A1 | 5/2019 | Berland et al. | |

FOREIGN PATENT DOCUMENTS

| | | |
|---|---|---|
| CN | 105789654 A | 7/2016 |
| CN | 110870127 A | 3/2020 |
| DE | 112018003107 T5 | 3/2020 |
| EP | 2212962 A1 | 8/2010 |
| GB | 2578413 A | 5/2020 |
| JP | H08250085 A | 9/1996 |
| JP | 2016001599 A | 1/2016 |
| JP | 2020-529712 A | 10/2020 |
| KR | 20110115276 A | 10/2011 |
| WO | 2010/035197 A1 | 4/2010 |
| WO | 2010/100599 A1 | 9/2010 |
| WO | 2019/030597 A1 | 2/2019 |

OTHER PUBLICATIONS

Office Action dated Dec. 12, 2019 for U.S. Appl. No. 15/810,344, 19 pages.

Office Action dated Apr. 28, 2020 for U.S. Appl. No. 15/810,344, 11 pages.

Office Action dated Sep. 14, 2020 for U.S. Appl. No. 15/810,344, 15 pages.

Chinese Office Action issued in related case dated Jul. 22, 2022 for Chinese Patent Application No. 201880046518.5, 10 pages.

International Search Report and Written Opinion in related case dated Dec. 5, 2018 for International Application No. PCT/IB2018/055599, 9 pages.

Notice of Reasons for Refusal issued in related case dated Oct. 19, 2021 for Japanese Patent Application No. 2020-505874, 4 pages.

List of IBM Patents or Patent Applications Treated as Related dated Jan. 26, 2023, 2 pages.

\* cited by examiner

LARGE CAPACITY SOLID STATE BATTERY

BACKGROUND

Technical Field

The present invention, generally, relates to battery technology, and more particularly, to a stacked battery structure and a method for fabricating thereof. The present invention also relates to a method of fabricating a stacked structure.

Description of Related Art

Recently, a solid thin film battery (STFB) has attracted attention as a promising rechargeable battery for the Internet of Things (IoT) devices in terms of its small footprint and safe nature. However, generally, a STFB does not have enough energy capacity. Since the capacity of the STFB is limited due to limitations on cathode thickness and thickening of the STFB is known to be technically difficult, stacking (or 3-dimensional packaging) is one of the solutions for enlarging the capacity of the battery using the STFB. However, the thickness of the substrate on which the STFB is fabricated becomes a bottleneck in achieving a large capacity battery.

In the field of semiconductor device fabrication processes, wafer back-grinding, which is a process for reducing wafer thickness by mechanical grinding, is known as the most common technique for wafer thinning. However, there are several disadvantages in applying the wafer back-grinding process to fabricate a stacked film battery structure. Such disadvantages include a limit of the substrate thickness that can be thinned by mechanical grinding. Even though the wafers can be thinned down to 75 to 50 um, it is still several times thicker than the thickness of the STFB, which can be less than or equal to about ten micrometers (~10 um).

A laminated thin film battery including a first thin film battery and a second thin film battery has been proposed, in which cathode current collectors and anode current collectors are formed on first surfaces, and the first and second thin film batteries are laminated in such a type that the respective first surfaces face each other (U.S. Pat. No. 9,634,334). However, the thickness of the substrate on which the thin film battery is fabricated is still a bottleneck to achieve a large capacity battery.

A monolithically integrated thin-film solid-state lithium battery device that includes multiple layers of lithium electrochemical cells has been also proposed (US Patent Application US2012/0058380). However, since the multiple layers of the lithium electrochemical cells are fabricated sequentially by physical vapor deposition techniques, materials that can be adopted for the cathode is limited in the integrated thin-film solid-state lithium battery device. The cathode materials such as $LiCoO_2$ requires a high temperature annealing process that cannot be employed since it makes sequential stacking difficult from a view point of heat resistance of other components.

Therefore, there is a need for a novel battery structure that is capable of thinning total thickness of the battery structure while maintaining its capacity.

SUMMARY

According to embodiments of the present invention, a method for fabricating a stacked battery structure is provided. The method includes preparing a base substrate. The method also includes preparing a battery layer formed on a support substrate, in which the battery layer includes a protection layer formed on the support substrate, a film battery element formed on the protection layer and an insulator covering the film battery element. The method further includes placing the battery layer onto the base substrate with the bottom of the support substrate facing up. The method further includes removing the support substrate from the battery layer at least in part by etching while protecting the film battery element by the protection layer.

The stacked battery structure fabricated by the methods according to the embodiments of the present invention can have thinner total thickness while maintaining capacity and the production cost of the stacked battery structure, which is also low since the support substrate on which the film battery element is formed can be thinned, or eliminated by etching while protecting the film battery element.

In a preferable embodiment, the method further includes alternately repeating stacking an additional battery layer having another support substrate with a bottom of the other support substrate facing up, and removing the other support substrate from the additional battery layer at least in part by etching, until a desired number of the battery layers are stacked. The additional battery layer includes a protection layer, a film battery element and an insulator. Thereby, capacity of the stacked battery structure can be enlarged while keeping total thickness of the battery structure. Since the thickness to be increased by stacking one unit of the battery layer is small, it is possible to increase the number of battery layers stacked within a certain thickness.

In other preferable embodiments, removing the support substrate includes wet-etching the support substrate until reaching the protection layer. Since the support substrate can be eliminated completely by cost effective wet-etching without damage on the film battery element behind the protection layer, it is possible to reduce the total thickness as much as possible while suppressing an increase in fabrication cost due to substrate thinning.

In further preferable embodiments, the support substrate is made of glass material, the wet-etching can include etching using a buffered hydrofluoric acid (BHF) solution, the protection layer works as an etch stopper against the BHF solution and the base substrate is made of a material having resistance against the BHF solution. Thus, throughput of the support substrate removal can be increased and a tool or material for protecting the base substrate can be made unnecessary.

In further preferable embodiments, the base substrate is provided with a base battery layer formed thereon, which includes a film battery element formed on the base substrate and an insulator covering the film battery element formed on the base substrate. The battery layer is placed onto the insulator of the base battery layer in placing the battery layer onto the base substrate. This makes the fabrication process more efficient.

In further other preferable embodiments, the film battery element in each battery layer includes current collectors and a battery cell in contact with the current collectors. The method further includes forming a via hole in the battery layers to extend through at least one layer to a layer under the at least one layer, wherein the support substrates down to the layer have been eliminated by the etching. The method further includes filling a conductive material in the via hole or depositing a conductive material on an inner surface of the via hole to form a conductive path electrically connected to at least one current collector in the battery layers. Since the via hole extending at least two battery layers can be fabricated collectively, the fabrication process for the conductive path can be simplified.

In further other preferable embodiments, forming the via hole includes drilling at least one protection layer and at least one insulator in the battery layers by laser processing while leaving the current collector. Fabrication cost for the conductive path can therefore be reduced.

In further other preferable embodiments, the via hole has plural sections and the plural sections have at least one horizontal dimension enlarged from bottom to top in the battery layers stacked on the base substrate and overlap each other in a horizontal plane with respect to the base substrate. The conductive path has contacts with plural current collectors in different battery layers, in which each contact is obtained at a surface of each of the plural current collectors. The reliability of contacts between the conductive path and the current collectors can therefore be improved.

According to other embodiments of the present invention, a stacked battery structure including a base substrate and two or more battery layers on the base substrate is provided. Each battery layer includes a protection layer; a film battery element formed on the protection layer; and an insulator covering the film battery element. In the stacked battery structure, the battery layers are stacked in an upside down manner with respect to the base substrate such that each insulator is on a base substrate side, each protection layer is on a side opposite to the base substrate side and the insulator of upper one of the battery layers bonds to a lower one of the battery layers.

The stacked battery structure according to the embodiments of the present invention can have thinner total thickness while maintaining its capacity or can have large capacity while keeping total thickness of the battery structure. Since the thickness to be increased by stacking one unit of the battery layer is small, it is possible to increase the number of battery layers stacked within a certain thickness.

In other preferable embodiments, the insulator of the upper one of the battery layers has a surface bonding to the protection layer of the lower one of the battery layers. In further other preferable embodiment, there is no rigid material interposed between the insulator of the upper one and the protection layer of the lower one. This makes it possible to reduce the total thickness.

According to further other embodiments of the present invention, an electronic device including an electronic component and a stacked battery structure is provided. The stacked battery structure includes a base substrate, two or more battery layers on the base substrate, and a wiring layer for connecting the stacked battery structure with the electronic component. Each battery layer includes a protection layer. Each battery layer also includes a film battery element formed on the protection layer, which is used for supplying power to the electronic component through the wiring layer. Each battery layer further includes an insulator covering the film battery element. In the electronic device, the battery layers are stacked in an upside down manner with respect to the base substrate such that each insulator is on a base substrate side, each protection layer is on a side opposite to the base substrate side and the insulator of upper one of the battery layers bonds to a lower one of the battery layers.

The electronic device according to further other embodiment of the present invention can have a large capacity battery while keeping a small footprint for the battery.

According to further other embodiments of the present invention, a stacked battery structure is provided. The stacked battery structure is fabricated by placing a battery layer having a support substrate onto a base substrate with the bottom of the support substrate facing up, in which the battery layer includes a protection layer formed on the support substrate; a film battery element formed on the protection layer and an insulator covering the film battery element. The stacked battery structure is fabricated by further removing the support substrate from the battery layer at least in part by etching while protecting the film battery element by the protection layer.

The stacked battery structure according to the embodiments of the present invention can have thinner total thickness while maintaining its capacity since the support substrate on which the film battery element is formed can be thinned, or eliminated while protecting the film battery element.

According to another embodiment of the present invention, a method for fabricating a stacked structure is provided. The method includes preparing a base substrate. The method includes preparing a device element layer having a support substrate, which includes a protection layer formed on the support substrate, a device element formed on the protection layer and an adhesive material covering the device element. The method includes placing the device element layer onto the base substrate with the bottom of the support substrate facing up. The method further includes etching the support substrate from the bottom of the support substrate until reaching the protection layer of the device element layer.

The stacked structure according to the embodiments of the present invention can have thinner total thickness while maintaining the number of stacked device layers in the stacked structure since the support substrate on which the devices is formed is eliminated while protecting the device element.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings. Note that the sizes and relative positions of elements and layers in the drawings are not necessarily drawn to scale. Some of these elements or layers are arbitrarily enlarged and positioned for improving legibility of drawing.

DETAILED DESCRIPTION

Now, the present invention will be described using particular embodiments, and the embodiments described hereafter are understood to be only referred to as examples and are not intended to limit the scope of the present invention.

One or more embodiments according to the present invention are directed to a stacked battery structure, a method for fabricating the stacked battery structure, a stacked battery structure fabricated by the method, an electronic device including the stacked battery structure, in which a large battery capacity can be achieved in a volume efficient manner.

Hereinafter, with reference to FIG. 1, a stacked battery structure according to an exemplary embodiment of the present invention will be described.

Figure 1:
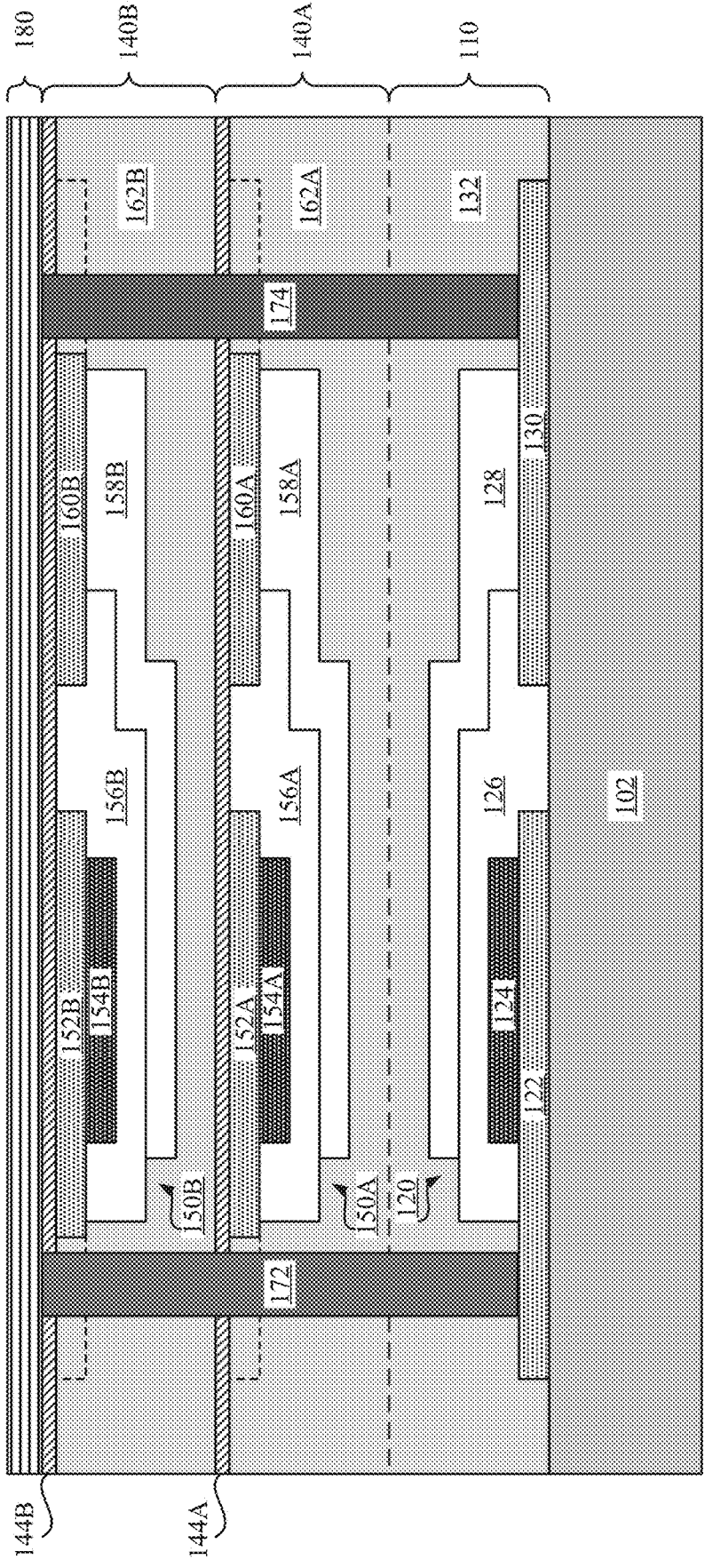
FIG. 1 illustrates a cross-sectional view of a stacked battery structure according to an exemplary embodiment of the present invention.

FIG. 1 illustrates a schematic of a stacked battery structure 100. A cross-sectional view of the stacked battery structure 100 is shown in FIG. 1. As shown in FIG. 1, the stacked battery structure 100 includes a base substrate 102; a plurality of battery layers 110, 140 stacked on the base substrate 102, each of which includes at least one film battery element; a pair of vias 172, 174 formed in the stacked battery layers 110, 140; and a wiring layer 180 built on the top of the stacked battery layers 110, 140.

In the described embodiment, the battery layers stacked on the base substrate 102 may include an upward base battery layer 110 with its film battery element facing up and two or more downward battery layers 140 with its film battery element facing down. In the stacked battery structure 100 shown in FIG. 1, there is one upward base battery layer 110 and two downward battery layers 140A, 140B stacked on the upward base battery layer 110.

The upward base battery layer 110 may be formed on the base substrate 102. The upward base battery layer 110 may include a film battery element 120 formed on the base substrate 102 and an insulator 132 that covers the film battery element 120. The downward battery layers 140 may be disposed on the insulator 132 of the upward base battery layer 110.

Each downward battery layer 140 includes a protection layer 144, a film battery element 150 formed on the protection layer 144 and an insulator 162 covering the film battery element 150.

Note that the orientation of the film battery element 150 in the downward battery layer 140 is opposite to that of the upward base battery layer 110. Each downward battery layer 140 is disposed on its underlying battery layer (110 or 140) in an upside-down manner with respect to the base substrate

102 such that each insulator 162 is on the side of the base substrate 102 and each protection layer 144 is on a side opposite to the base substrate side. The downward battery layers 140 are stacked such that the insulator of an upper one of the battery layers (e.g., 162B) bonds to a lower one of the battery layers (e.g. 140A), and the insulator of the lowermost downward battery layer (i.e., 162A in FIG. 1) bonds to the upward base battery layer 110.

The base substrate 102 may be made of any one of rigid materials such as a silicon, an alumina ceramic, a glass, mica, etc., to name but a few. However, since the fabrication process of the film battery element 120 may include a heating process for cathode material, thus, the base substrate 102 is preferably made of heat-resistant materials that can withstand the heating process for the cathode material.

The protection layer 144 may be made of a chemically resistant material that can be usable as an etch stopper against wet-etching, which may be performed in the fabrication process of the stacked battery structure 100. The fabrication process will be described later. In a particular embodiment, the protection layer 144 is made of a chemically inert material usable as an etch stopper against wet-etching using buffered hydrofluoric acid (BHF) solution. The protection layer 144 can also prevent moisture or liquid from invading components of the film battery element 150, such as an electrolyte. In view of the fabrication process of the film battery element 150, the protection layer 144 onto which the film battery element 150 is fabricated is preferably made of heat-resistant materials that can withstand the heating process for the cathode material. In view of the fabrication process of the vias 172, 174, the protection layer 144, through which via holes are fabricated, is preferably made of material having relatively lower dry etch resistance that can be laser processed. Such material includes, but is not limited to, silicon nitrides SiN (e.g., $Si_3N_4$). However, in other embodiments, other inorganic materials such as poly-silicon may also be used as long as the material does not interfere with via hole fabrication and has etching and heat resistance. The material of the protection layer 144 can be deposited by virtually any standard means including vapor deposition techniques. Thickness of the protection layer 144 may range from about 0.1 to about 1.0 um.

The insulators 132, 162 may be made from adhesive material such as a resin having a certain curing temperature that may be in a range of 150-250 degrees Celsius, for example. Any laser-processable adhesive resin that can be drilled by laser may be used as the material for the insulator 132, 162. Such resin may include BCB (benzocyclobutene) resin, etc. to name but a few.

The upward base battery layer 110 and the lowermost downward battery layers 140A may be bonded by the insulators 132, 162A of the battery layers 110, 140A. The lower and upper downward battery layers (e.g., 140A, 140B) may be bonded by the upper insulator (e.g., 162B) that is provided therebetween.

By curing, the insulators 132 of the upward base battery layer 110 and the insulator 162A of the lowermost downward battery layers 140A may be integrally fixed together. The insulator of the upper battery layer (e.g., 162B) may have a surface bonding to the protection layer of the lower battery layer (e.g., 144A). In the final stacked battery structure 100 shown in FIG. 1, there is no rigid material interposed between the insulator of the upper one (e.g., 162B) and the protection layer of the lower one (e.g., 144A).

Each film battery element 150 in the downward battery layer 140 may include a cathode current collector (CCC) 152; a cathode 154 connected to the cathode current collector 152; an electrolyte 156 having an interface to the cathode 154; an anode 158 having an interface to the electrolyte 156; and an anode current collector (ACC) 160 connected to the anode 158. The cathode 154, the electrolyte 156 and the anode 158 constitutes a battery cell that is in contact with the current collectors 152, 160. The film battery element 120 in the upward base battery layer 110 may have a structure identical or similar to that of the film battery element 150 in the downward battery layer 170 and may also include a cathode current collector 122, an anode current collector 130 and a battery cell in contact with the current collectors 122, 130, which may contain a cathode 124, an electrolyte 126 and an anode 128.

The cathode current collectors 122, 152A, 152B and the anode current collectors 130, 160A, 160B may be made of any one of metals (e.g., Cu, Pt, Al, Au, etc.) and other conductive materials (e.g. graphite, carbon nanotube, etc.) as long as it is adequate for respective material of the cathode 124, 154 and the anode 128, 158. The cathode current collector 122 and the anode current collector 130 may be formed on the base substrate 102. The cathode current collectors 152A, 152B and the anode current collectors 160A, 160B may be formed on the respective protection layers 144A, 144B.

Note that if the protection layer 144 is made of conductive material, there may be an additional non-conductive layer interposed between the current collectors 152, 160 and the protection layer 144. Also note that if the base substrate 102 is made of conductive material, there may be an additional non-conductive layer between the current collectors 122, 130 and the base substrate 102.

The cathode 124, 154 may be made of crystalline or nano-crystalline lithium intercalation compounds such as $LiCoO_2$, $LiMn_2O_4$, to name but a few. The material of the cathode 124, 154 can be deposited by virtually any standard means including vapor deposition techniques such as sputtering, and the film obtained by low temperature deposition may be annealed at a predetermined annealing temperature (usually in a range of 500-700 degrees Celsius) to obtain fully crystalline phases. Alternatively, the material of the cathode 124, 154 can be deposited by virtually any standard means including vapor deposition technique while heating the substrate at a predetermined deposition temperature. Other unannealed cathode material such as nano-crystalline $Li_xMn_{2-x}O_4$ may not be excluded from candidates for the cathode material.

The electrolyte 126, 156 may be any one of solid electrolytes such as ceramic electrolyte including lithium oxide based electrolytes (e.g. a lithium phosphorus oxynitride (LiPON), lithium lanthanum titanium oxide (LLTO), etc.), lithium sulfide based electrolytes and other lithium phosphate based electrolytes such as a lithium borophosphate (LiBP). The electrolyte 126, 156 can be deposited by virtually any standard means including vapor deposition techniques such as sputtering. In the embodiment shown in FIG. 1, the electrolyte 126, 156 may be deposited on the cathode 124, 154 so as to fully cover surface and edges of the cathode 124, 154.

The anode 128, 158 may be made of any one of a silicon and materials that have a melting point higher than curing temperature of the insulator 132, 162. Specifically, the anode 128, 158 may be Li-free anode, in which the anode is formed by electroplating of metallic lithium or lithiation at the interface between the electrolyte 126, 156 and the anode current collector 130, 160 upon the initial charge. Alternatively, the anode 130, 160 may be Li-ion anode such as silicon tin oxynitride (SiTON), tin and zinc nitrides. By employing aforementioned anode material, the anode 130 can withstand temperatures for curing the insulator 132, 162. However, in other embodiments, metallic lithium, which has a melting point of 180 degrees Celsius, may not be excluded from candidates for the anode material as long as the anode material can withstand the curing temperature for curing the insulator 132, 162.

In a preferable embodiment, each film battery element 120, 150 can be fabricated as an all-solid-state thin film battery, more specifically, an all-solid-state lithium ion thin film battery. In a particular embodiment, the total thickness of the film battery element 120, 150 may be less than or equal to about ten micrometers (e.g. ~10 um).

The vias 172, 174 may be formed within the stacked battery layers 110, 140 to provide a conductive path between an external device and the film battery elements 120, 150 in the stacked battery layers 110, 140. Note that in the described embodiment, the vias 172, 174 may extend through at least one battery layer (140B, 140A in FIG. 1) to a layer under the at least one battery layer (110 in FIG. 1), which includes one or more protection layers (144B, 144A in FIG. 1) and one or more insulators (162B, 162A, 132 in FIG. 1).

Each via 172 (or 174) may be formed in a via hole that is opened through at least one of the stacked battery layers 110, 140. The via hole may be formed through one or more battery layer 110, 140, collectively. The via holes 172, 1744 are made conductive by filling conductive material (e.g., solder paste) or depositing conductive material (e.g., metal) on its inner surface to form the vias 172, 174.

Each via 172 (or 174) is electrically connected to at least one of the current collectors 122, 152 (or 130, 160) in the stacked battery layers 110, 140. In one or more embodiments, each via has contacts with plural current collectors in different battery layers, in which each contact is obtained at a surface of each of the plural current collectors.

In the described embodiment shown in FIG. 1, the via 172 may have contacts at respective surfaces of the cathode current collectors (e.g., 122, 152A, 152B). The via 174 may have contacts at respective surfaces of the anode current collectors (e.g., 130, 160A, 160B).

Note that according to FIG. 1, it seems that the via 172 (or 174) is not in contact with the current collectors 152A, 152B (160A, 160B) of the downward battery layers 140A, 140B. However, the vias 172 (or 174) are in contact with the current collectors 152A, 152B (or 160A, 160B) at different cross-sections, respectively. The outlines of the current collectors 152, 160 at different cross sections are indicated by dashed lines in FIG. 1.

The wiring layer 180 that is built on the top of the stacked battery layers 110, 140 may have a conductive element (wiring pattern) connecting the vias 172, 174 with external terminals, which may be connected to the external device such as a CPU (Central Processing Unit), memory, etc. The wiring layer 180 may also be made from a resin as insulator for the wiring layer. The resin may be any one of a BCB (benzocyclobutene) resin, a polyimide and other polymers.

The structure of the stacked battery structure 100 may not be limited to the specific embodiment shown in FIG. 1. Although not shown in FIG. 1, there may be an additional layer in the stacked battery structure 100. For example, the film battery element 120, 150 may be covered by other protective coatings before deposition of resin of the insulator 132, 162.

Also, the layout of the film battery elements 120, 150 within the stacked battery structure 100 may not be limited to the specific embodiments shown in FIG. 1 where all of the film battery elements 120, 150 are connected by the via 172, 174 in parallel.

In other embodiments, such a layout where at least two of the film battery elements 120, 150 are connected in series by using vias and/or a surface wiring layer such as the wiring layer 180 may be employed. Connecting the film battery elements 120, 150 in series can increase a terminal voltage of the stacked battery structure 100 while maintaining a small footprint of the stacked battery structure. Since electrode materials that are not practically used so far due to their lower potential difference can be employed by connecting the elements in series, a range of design choices for electrode materials can be broadened. Also, in other aspects, a plurality of terminal voltages can be obtained from the stacked battery structure 100 with appropriate serial connections.

In a particular embodiment, interconnections between plural layers can be achieved by not only a via but also other surface wiring layer such as the wiring layer 180 after routing each electrical path from each current collector to top of the stack by a respective via structure. The via may be opened through all layers including top to bottom layers or may be opened through a part of the layers by terminating the hole at a current collector of the middle layer. Even if the via is opened through the all layers from top to bottom, the via may not be required to connect with all current collectors.

Hereinafter, with reference to a series of FIGS. 2A-2E, FIGS. 3A-3C and FIGS. 4A-4C, a process for fabricating a stacked battery structure 100 according to an exemplary embodiment of the present invention will be described.

FIGS. 2A-2E, FIGS. 3A-3C and FIGS. 4A-4C illustrate cross-sectional views of structures being obtained at each step of the fabrication process of the stacked battery structure 100.

Figure 2A:
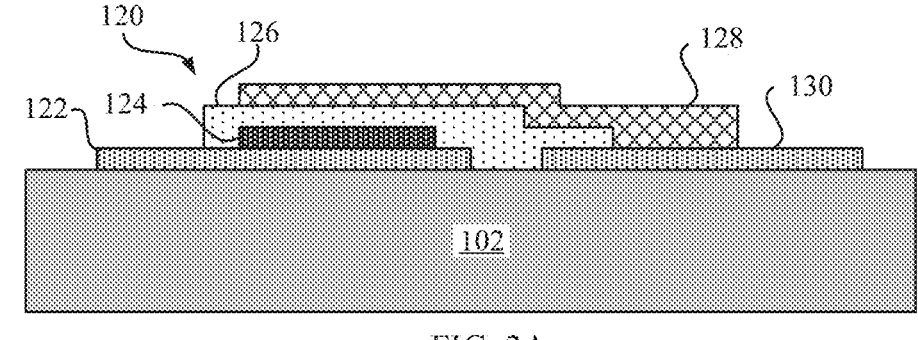
FIGS. 2A, 2B, 2C, 2D and 2E illustrate cross-sectional views of structures being obtained at each step in a first one-third part of the fabrication process of a stacked battery structure according to an exemplary embodiment of the present invention.

As shown in FIG. 2A, the fabrication process may include a step of preparing a base substrate 102 that has a film battery element 120 fabricated thereon. In a particular embodiment, the base substrate 102 prepared by this step is made of bulk silicon, which has resistance against BHF solution and heat. The film battery element 120 that includes a cathode current collector 122, a cathode 124, an electrolyte 126, an anode 128 and an anode current collector 130 may be fabricated on the base substrate 102 by virtually any standard process as exemplarily described below with respect to the film battery element 150 for the downward battery layer 140.

Figure 2B:
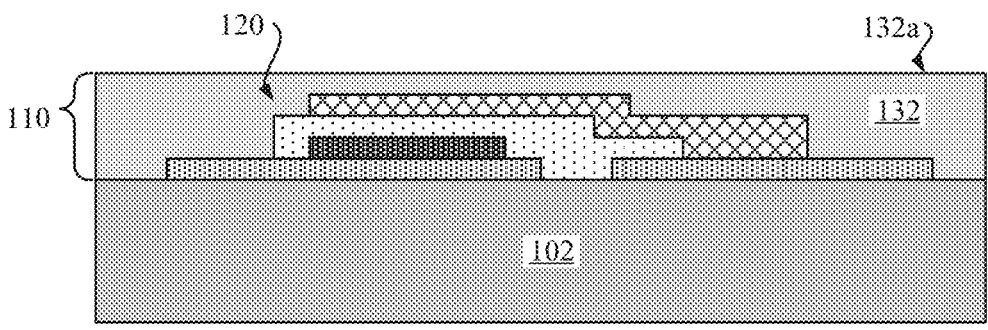

As shown in FIG. 2B, the fabrication process may also include a step of forming an insulator 132 over the film battery element 120 and the base substrate 102 to obtain a base battery layer 110 formed on the base substrate 102. In a particular embodiment, this step may include a sub-step of depositing an insulation material over the film battery element 120; and a subsequent sub-step of flattening of the insulation material to obtain a flat top surface 132a by adequate method as exemplarily described below with respect to the downward battery layer 140.

Figure 2C:
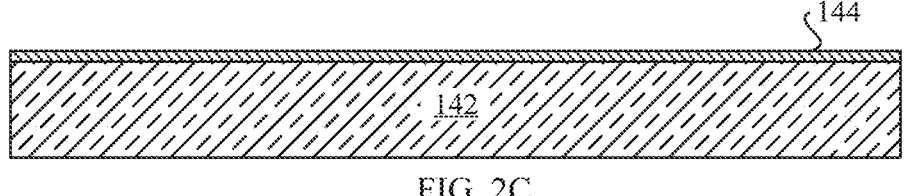

As shown in FIG. 2C, the fabrication process may further include a step of preparing a support substrate 142 that has a protection layer 144 formed thereon. The support substrate 142 onto which the film battery element 150 is fabricated is preferably made of heat-resistant materials that can withstand the heating process for the cathode 154. In a particular embodiment, the support substrate 142 prepared by this step is made of glass material, which has relatively high etch rate in the BHF solution and also heat resistance. The protection layer 144 may be made of a chemically resistant material that can be usable as an etch stopper against wet-etching using the BHF solution. In a particular embodiment, the protection layer 144 is made of silicon nitrides SiN (e.g., $Si_3N_4$), which has low etch rate in the BHF solution and also heat resistance. The protection layer 144 can be formed on the glass substrate by virtually any standard means including a vapor deposition technique such as RF magnetron sputtering, Plasma-enhanced chemical vapor deposition (PECVD), low-pressure chemical vapor deposition (LPCVD) to name but a few.

Figure 2D:
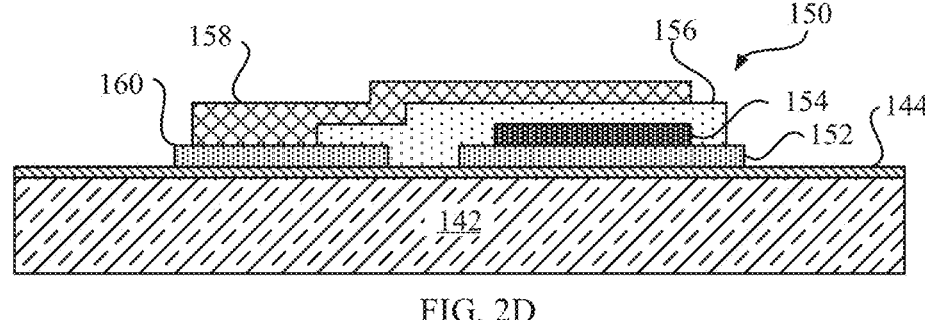

As shown in FIG. 2D, the fabrication process may include a step of fabricating the film battery element 150 on the support substrate 142 with the protection layer 144 interposed therebetween. The film battery element 150 may be fabricated on the support substrate by using any conventional process. For example, the film battery element 150 can be fabricated by a sequence of vapor deposition processes.

The exemplary process of fabricating the film battery element 150 may include (a) a step of depositing anode and cathode current collectors 152,160 on the protection layer 144; (b) a step of depositing a cathode 154 on the cathode current collector 152 under low temperature; (c) a step of annealing the cathode 154 at a predetermined annealing temperature (e.g. in a range of 500-700 degrees Celsius) to obtain a fully crystalline phase; (d) a step of depositing an electrolyte 156 with fully covering the cathode 154; and (e) a step of depositing an anode 158 on the electrolyte 156 and the anode current collector 160. In other embodiment, the process may include (f) a step of depositing the cathode 154 on the cathode current collector 152 under a predetermined deposition temperature while heating the support substrate 142, instead of the steps of (b) and (c).

As shown in FIG. 2C, the fabrication process may further include a step of forming the insulator 162 over the film battery element 150 and the protection layer 144 to obtain a battery layer 140 formed on the support substrate 142 with the protection layer 144 interposed therebetween.

In a particular embodiment, the step of forming the insulator 162 may include a sub-step of depositing an insulation material over the film battery element 150; and a subsequent sub-step of flattening of the insulation material to obtain a flat top surface 162a by squeezing the insulation material, fly-cutting the insulation material, or chemically and mechanically polishing the insulation material. Alternatively, the sub-step of flattening can be done based on spin on glass technique where the support substrate 142 retaining insulation material deposited thereon are spun at high speeds to distribute the isolation material uniformly across a top surface of the protection layer 144.

Figure 2E:
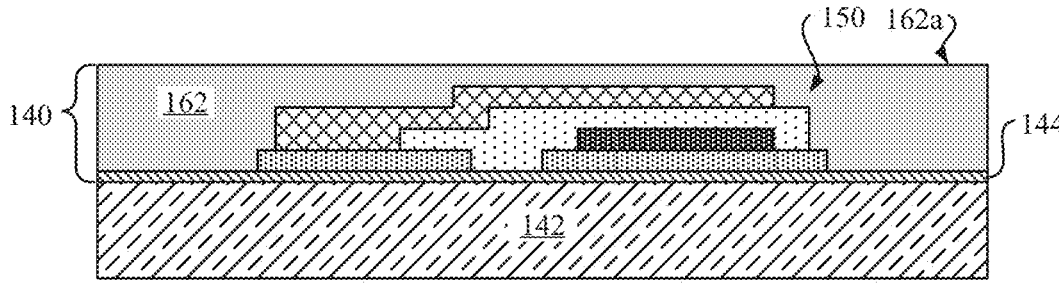

By repeating the steps described in the series of FIGS. 2C-2E a predetermined number of times, the desired number of the battery layers 140 formed on respective support substrate 142 can be prepared separately. Note that the steps described in the series of FIGS. 2C-2E may be repeated in parallel or in series, and performed after or before the steps described in the series of FIGS. 2A-2B.

Figure 3A:
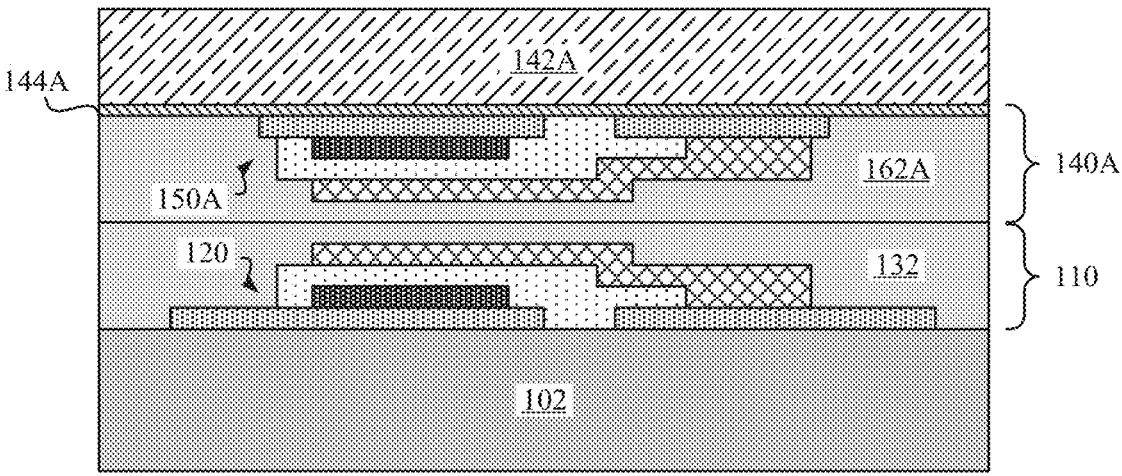
FIGS. 3A, 3B and 3C illustrate cross-sectional views of structures being obtained at each step in a middle one-third part of the fabrication process of the stacked battery structure according to the exemplary embodiment of the present invention.

As shown in FIG. 3A, the fabrication process may include a step of placing the battery layer 140A with the support substrate 142A onto the base substrate 102 with the bottom of the support substrate 142A facing up. In the described embodiment, since the base substrate 102 is provided with the base battery layer 110 formed thereon, the battery layer 140 is disposed on the insulator 132 of the base battery layer 110 in an upside down manner such that the insulator 162 is on the side of the base substrate 102 and the protection layer 144 (and the support substrate 142A), where the film battery element 150A is fabricated on, is on a side opposite to the base substrate side.

Figure 3B:
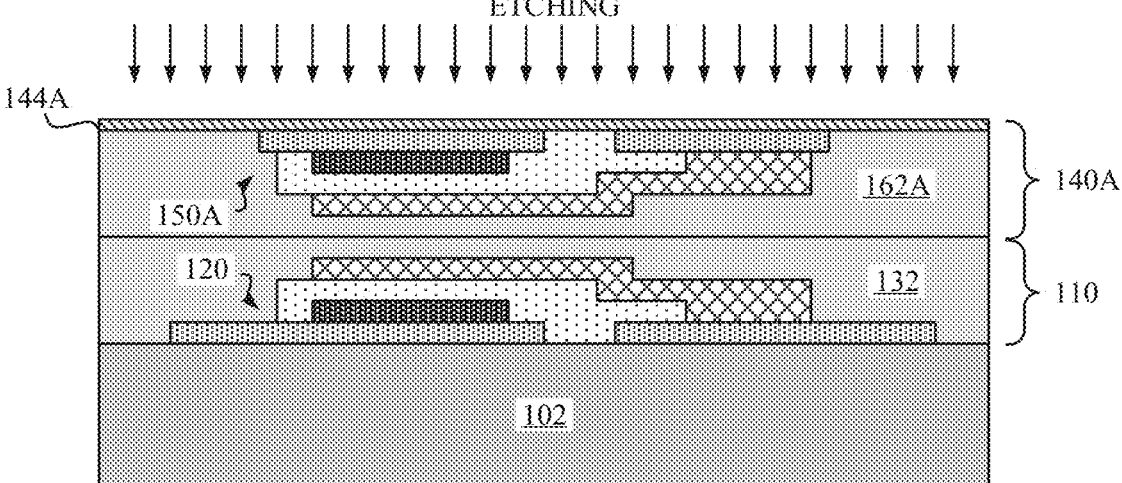

As shown in FIG. 3B, the fabrication process may include a step of removing the support substrate 142A from the battery layer 140A by etching while protecting the film battery element 150A by the protection layer 144A. The etching may be chemical etching. In the described embodiment, the support substrate 142 may be completely eliminated from the battery layer 140 by wet-etching the support substrate 142 until reaching the protection layer 144 as illustrated in FIG. 3B, while leaving its underlying structure untouched. When the support substrate 142 is made of glass material and the base substrate 102 is made of silicon material, the wet-etching using BHF solution can be employed since it has high selectivity for the silicon dioxide $SiO_2$ over the silicon. The protection layer 144 works as an etch stopper against BHF wet-etching.

If the base substrate 102 is made of a material having resistance against BHF such as silicon, the backside of base substrate 102 is not required to be protected during the wet-etching. Thus, a special tool or material for protecting the base substrate 102 can be made unnecessary. However, in other embodiments, a material not having resistance against BHF is not excluded as a material of the base substrate 102, as long as the backside of the base substrate 102 can be protected by any known tool such as wafer chucks or chemically resistant material such as silicon nitride, which allows for back-side protection during wet-etching.

Note that the support substrate 142 is illustrated as being fully eliminated from the battery layer 140 in FIG. 3B. However, an alternative embodiment where the support substrate 142 is removed from the battery layer 140A in part by etching may also be contemplated.

Figure 3C:
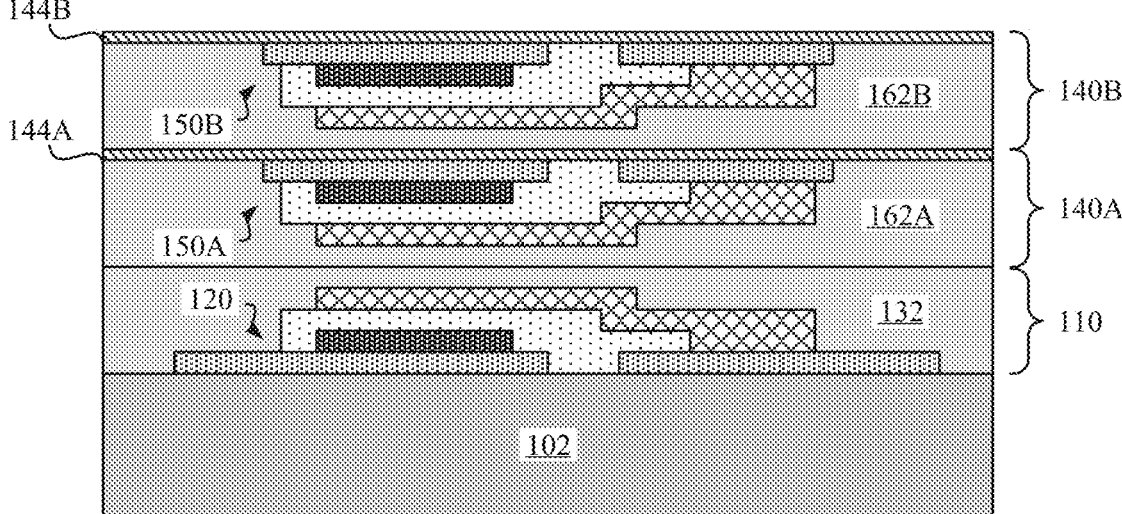

As shown in FIG. 3C, the fabrication process may include a step of repeatedly stacking the additional battery layer (e.g. 140B) until the desired number of the battery layers 140 is stacked. The step of repeatedly stacking the additional battery layer 140 may include alternately performing a sub-step of stacking the additional battery layer 140 with other support substrate 142 and a sub-step of removing the support substrate 142 from the additional battery layer 140. For each repeating cycle, the additional battery layer 140 with the support substrate 142 is stacked with the bottom of the support substrate 142 facing up. Then, the support substrate 142 is removed from the additional battery layer 140 at least in part by etching in the same way as described with reference to FIG. 3B.

In a particular embodiment, after the desired number of the battery layers 140 are stacked, the insulators 132, 162A, 162B, which may be partly cured after each time stacking the battery layer 140, are fully cured by making the resin of the insulator 132, 162A, 162B undergo the curing temperature. By fully curing the insulator 132, 162A, 162B, each of upper and lower layers in the stacked battery layers 110, 140A, 140B are rigidly fixed to each other.

Figure 4A:
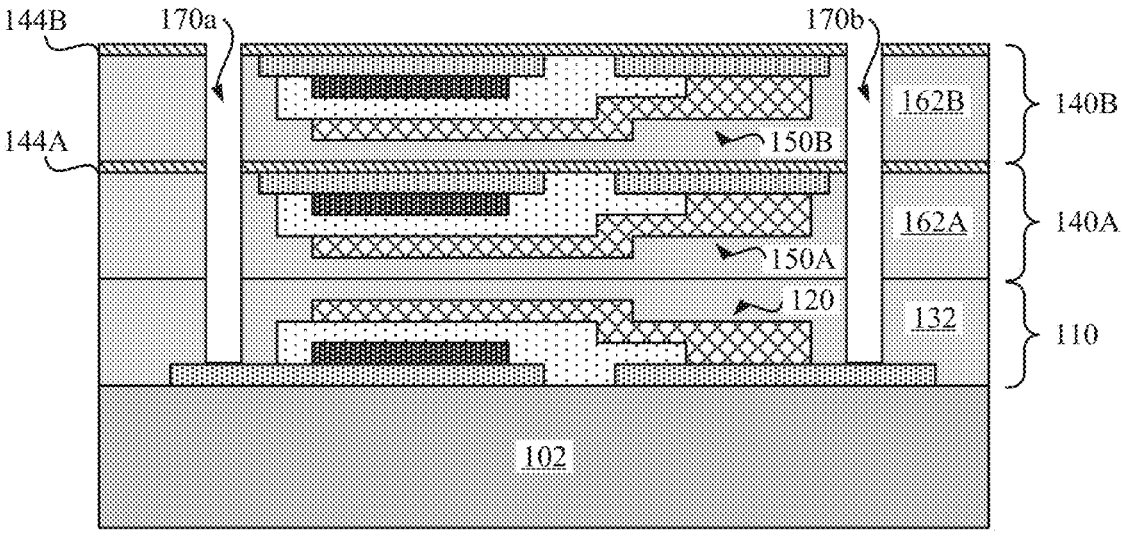
FIGS. 4A, 4B and 4C illustrate cross-sectional views of structures being obtained at each step in a last one-third part of the fabrication process of the stacked battery structure according to the exemplary embodiment of the present invention.

As shown in FIG. 4A, the fabrication process may include a step of forming via holes 170a, 170b into the stacked battery layers 110, 140A, 140B. The via holes 170a, 170b may extend through at least one layer to its underlying layer, when the support substrates 142 down to the layer have been eliminated by the etching. In FIG. 4A, the support substrates 142B, 142A down to the battery layer 140A have been eliminated by the etching and the via holes 170a, 170b extends through two battery layers 140B, 140A to its underlying layer 110. The via holes 170a, 170 may be formed in the stacked battery layers perpendicular to or obliquely to the base substrate 102.

If a laser-processable insulator material is used for the insulator 132, 162A, 162B, the via holes 170a, 170b can be formed by directly drilling both of the insulators 162B, 162A, 132 and the protection layer 144B, 144A in the stacked battery layers by laser processing while leaving the current collector 122, 130, 152, 160. The hole may have a dimension of several tens micrometers (e.g., 50 um diameter/width).

Figure 4B:
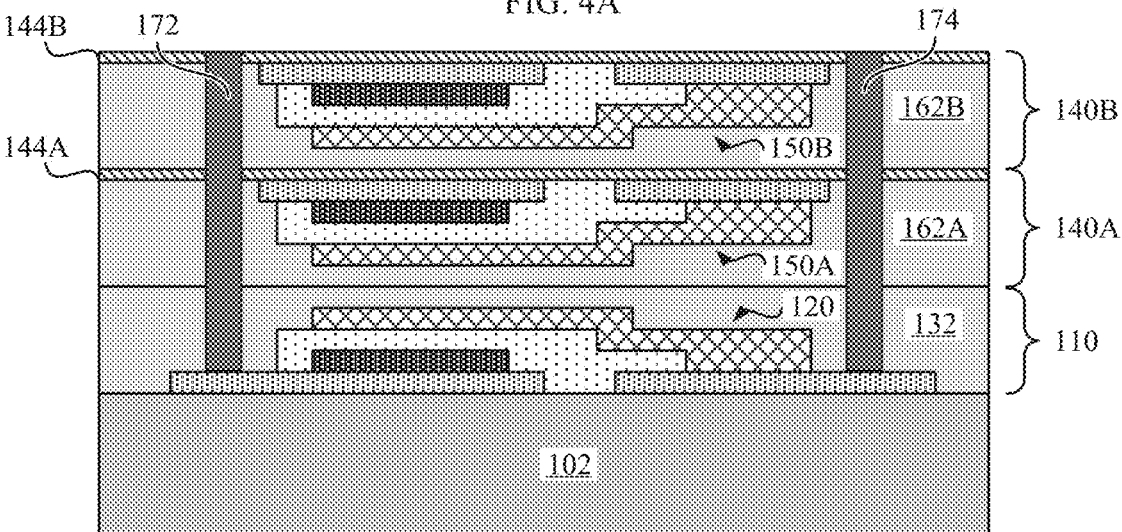

As shown in FIG. 4B, the fabrication process may include a step of filling a conductive material in the via holes 170a, 170b to form the vias 172, 174 as the conductive paths. The filling of the conductive material can be performed by virtually any standard means such as solder paste filling. In the described embodiment, each via 172 (or 174) is electrically connected to the respective current collectors 122, 152A, 152B (or 130, 160A, 160B) in the stacked battery layers. In alternative embodiment, the fabrication process may include a step of depositing a conductive material on the inner surface of the via holes 170a, 170b instead of filling with the conductive material.

By performing the steps described in a series of FIGS. 4A-4B, the conductive paths, each of which is connected to the respective current collectors, can be formed within the stacked battery layers 110, 140. The process for fabricating the conductive path will be described later in more detail.

Figure 4C:
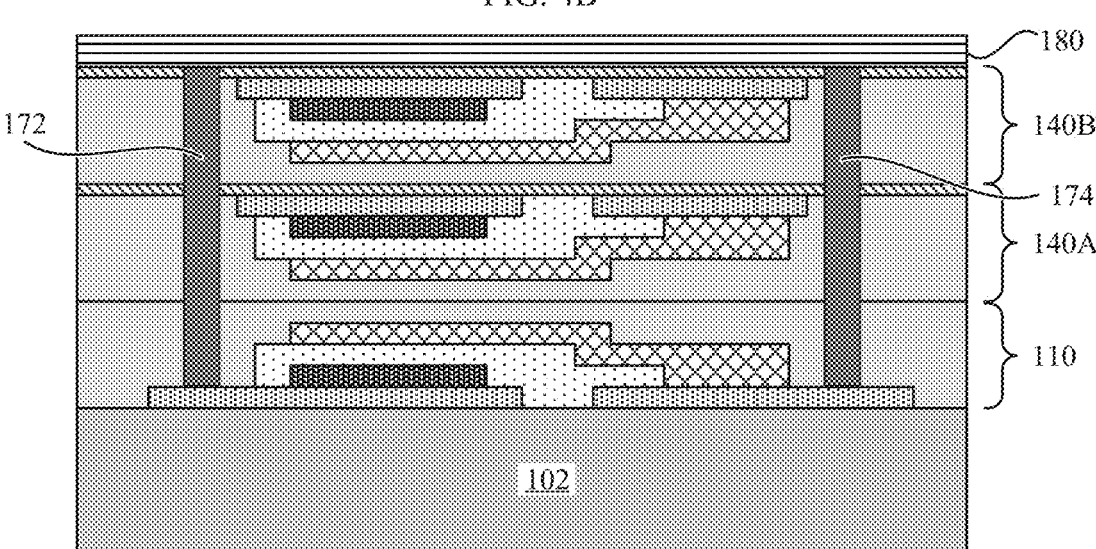

As shown in FIG. 4C, the fabrication process may include a step of building the wiring layer 180 on the top of the battery layers 110, 140A, 140B. The wiring layer 180 may have a conductive element that connects the vias 172, 174 with external terminals, which is used to connect to an external device, such as a CPU or memory. A resin may be formed over the conductive element as an insulator.

Although the aforementioned description has been focused on a single stacked battery structure 100, the fabrication process can be conducted on not only the chip or package level but also wafer or panel level. In a particular embodiment, the base substrate 102 and the support substrate 142 may have a wafer or panel form, and the base substrate 102 and the support substrate 142 may include a plurality of the film battery elements 120, 150 formed thereon. After bonding the plurality of the battery layers 110, 140, which may be in a form of a wafer or panel, may be diced into a plurality of chips, each of which has a structure identical to the stacked battery structure 100 shown in FIG. 1.

According to the exemplary embodiment shown in FIGS. 2A-2E, FIGS. 3A-3C and FIGS. 4A-4C, since each battery layer 110, 140 prepared for stacking has the film battery element 120, 150 that is already fabricated thereon separately, other components of the stacked battery structure 100 would not be damaged due to the heating process for cathode 124, 154, in contrast to sequential stacking that fabricates multiple layers of electrochemical cells sequentially, in which previously formed other components such as an anode for a lower layer should withstand the heating process for the cathode to be formed later for an upper layer. In other words, the material of the cathode 124, 154 can be transformed into a crystalline phase without damaging the other components.

Since the most probable thermal process after the stacking may be curing of the insulator 132, 162 and the wiring layer 180, the other components would not be damaged throughout the fabrication process as long as the components of the stacked battery structure 100 can withstand the curing temperature.

With reference to a series of FIG. 5 and FIGS. 6A-6E, a process for fabricating a via having a stepped shape structure according to the exemplary embodiment of the present invention will be described.

Figure 5:
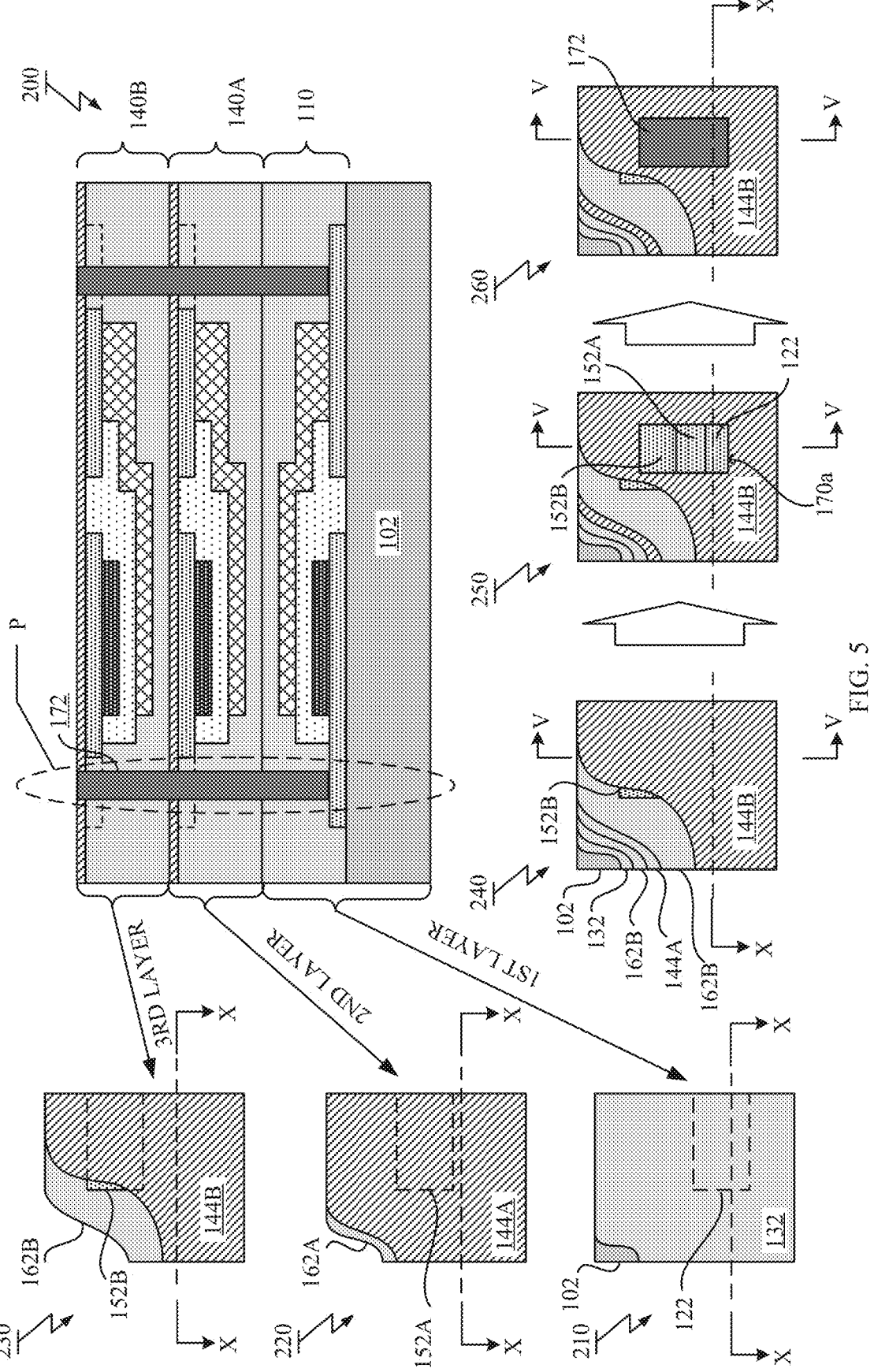
FIG. 5 shows a schematic diagram of connected current collectors in the stacked battery structure according to an exemplary embodiment of the present invention.

FIG. 5 shows a schematic of connected current collectors 122, 152 by the via 172 in the stacked battery structure 100. In FIG. 5, there are a cross-sectional view 200 of the stacked battery structure 100, top views 210, 220, 230 of three battery layers 110, 140A, 140B at a portion around the cathode current collector 122, 152A, 152B (as indicated by a dashed circle P in FIG. 5) before stacking. A relation between the cross-sectional view 200 and the top views 210, 220, 230 is depicted by arrows and labels in FIG. 5. The cross-sectional view 200 corresponds to a cross-section indicated by the "X" in the top views 210, 220, 230 of FIG. 5. Note that the outlines of the current collectors 152, 160 that do not appear in the cross section of the cross-sectional view 200 are indicated by dashed lines in FIG. 5.

In FIG. 5, there are further top views 240, 250, 260 of the stacked battery layers just after the stacking step, just after the via hole forming step and just after the filling step, respectively. FIGS. 6A-6E illustrates a process for fabricating the via 172 with the stepped shape structure. The cross-sectional views shown in FIGS. 6A-6E correspond to an enlarged view of a portion indicated by a dashed circle P along with a cross-sections indicated by the "V" in the FIG. 5.

As shown in the top view 210 for the first layer (i.e., the base battery layer 110), the base substrate 102, the cathode current collector 122, which is indicated by dashed rectangle in the top view 210, and the insulator 132 are layered. As shown in the top views 220, 230, the insulator 162, the cathode current collector 152, which is also indicated by dashed rectangles in the top view 220, 230, and the protection layer 144 are layered for each of the second and third layers (i.e., the battery layer 140A, 140B). Note that locations of the cathode current collectors 122, 152A, 152B (possibly together with the entire structure of the film battery element 120, 150A, 150B) are shifted along with a direction in a horizontal plane of the base substrate 102.

Figure 6A:
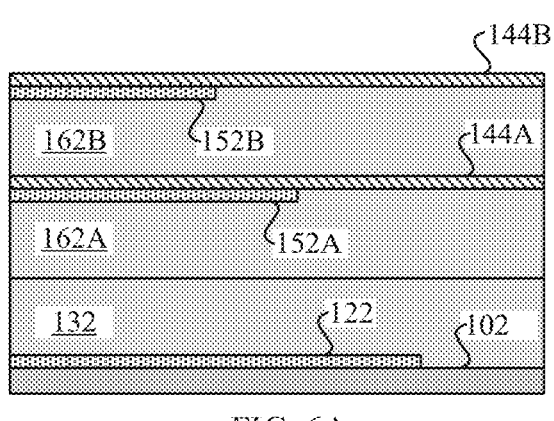
FIGS. 6A, 6B, 6C, 6D, 6E and 6F illustrate a process for fabricating a via with a stepped shape structure in accordance with exemplary embodiments of the present invention.

The top view 240 in FIG. 5 shows the top surface of the stacked battery layers 110, 140A, 140B just after the stacking steps of the desired number of the battery layers 110, 140. FIG. 6A depicts a cross-sectional view of the stacked battery layers 110, 140A, 140B just after the stacking steps. As shown in the top view 240 of FIG. 5, the top surface of the protection layer 144B of the third battery layer 140B can be seen just after the stacking steps.

Figure 6B:
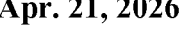
Figure 6B:
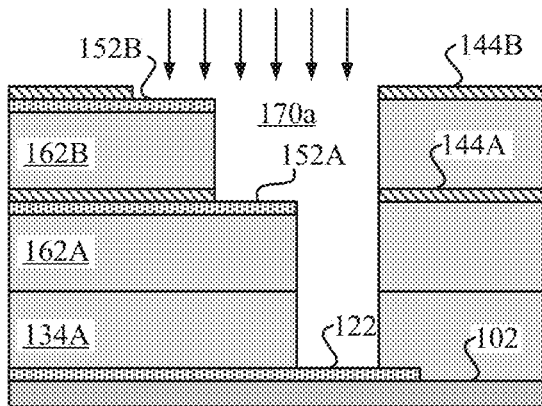

The top view 250 in FIG. 5 shows the top surface of the stacked battery layers 110, 140A just after the via hole forming step. FIG. 6B depicts a cross-sectional view of the stacked battery layers 110, 140A, 140B just after the via hole forming step. By drilling the protection layers 144B, 144A and the insulators 162B, 162A, 132 from the top to bottom, the via hole 170a is fabricated through the stacked battery layers 110, 140A, 140B. Note that the current collector 152B, 152A, 122 may work as a stopper for laser drilling, accordingly, the current collector 152B, 152A, 122 would leave on the insulator 162B, 162A, 102 with their underlying structures untouched after the course of the laser processing.

As shown in FIG. 6B, the via hole 170a may have at least one respective horizontal dimension enlarged from bottom to top in the stacked battery layers 110, 140A, 140B and each section may overlap each other in a horizontal plane of the base substrate 102. As shown in the top view 250 of FIG. 5, after the via hole forming step, surfaces of all cathode current collectors 122, 152A, 152B can be seen through the via hole 170a when viewed from normal direction with respect to the base substrate 102.

Figure 6C:
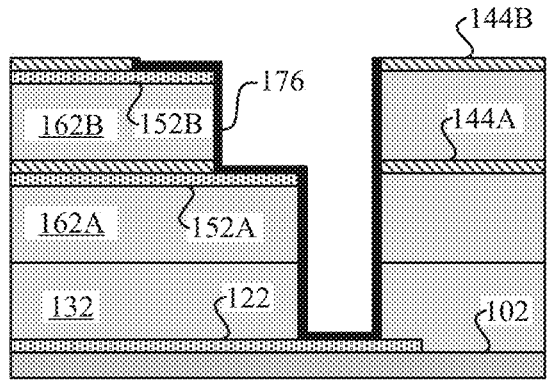
Figure 6D:
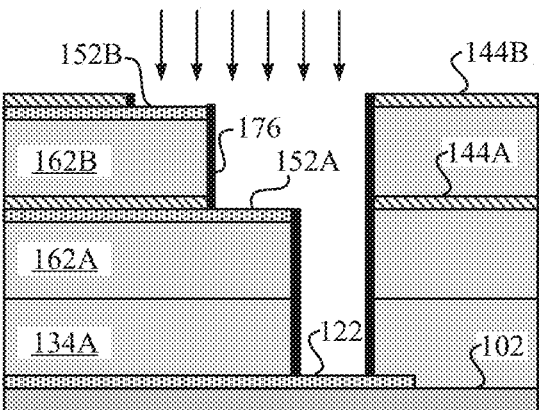
Figure 6E:
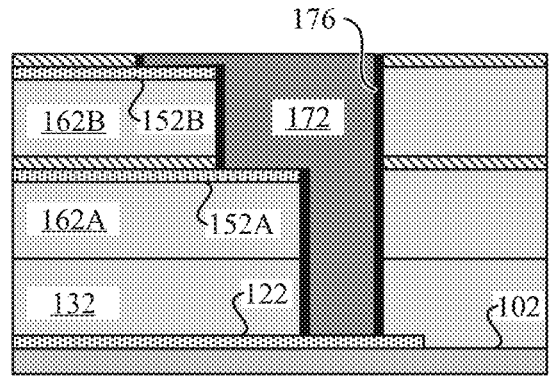
Figure 6F:
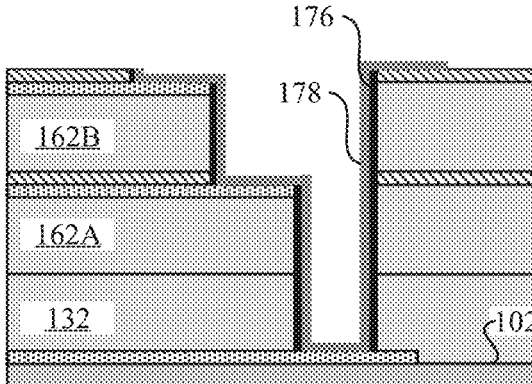

FIGS. 6C-6E show the process of via fabrication after making the through hole 170a with cross-sectional views of the structure. FIG. 6F shows the alternative process of via fabrication after making the through hole 170a with a cross-sectional view of the structure.

As shown in FIG. 6C, an inner surface of the via hole 170a may be coated with an insulation material (e.g., polymer) 176. The coating of the insulation material can be performed by any standard means such as vapor deposition polymerization.

As shown in FIG. 6D, then, portions of the insulation material 176 that are deposited on the cathode current collectors 122, 152A, 154B may be etched back by standard anisotropic etching so as to expose the surfaces of the cathode current collectors 122, 152A, 152B. At this point, the via hole 170a may have plural sections, each of which has a terrace exposing the cathode current collector (e.g., the cathode current collectors 152A, 152B) or an inner bottom surface exposing the cathode current collector (e.g., the cathode current collector 122).

As shown in FIG. 6E, the conductive material are filled into the hole 170a to form the via 172. The top view 260 in FIG. 5 shows the top surface of the stacked battery layers 110, 140A just after the filling step. As shown in the top view 260, after the filling step, the top end of the via 172 that exposes at the top surface of the protection layer 144B of the third battery layer 140B can be seen when viewed from the normal direction with respect to the base substrate 102 while all cathode current collectors 122, 152A, 152B are covered by the conductive material. Alternatively, the conductive material may be deposited on the inner surface of the via hole 170a to form the via 172 as shown in FIG. 6F.

Note that the step of coating the inner surface of the via hole 170a and a step of etching back the portions of the insulation material 176 may be omitted if there is no conductive material that exposes at the inner surface of the via hole 170a other than current collectors 152, 122. In a particular embodiment where the protection layer 144 is made of insulation material such as the silicon nitride, and the support substrates 142 are completely eliminated by etching or the support substrates 142 is made of insulation material such as glass when the support substrates 142 is still present in part, the step of coating and the step of etching back can be omitted.

Such stepped shape structure shown in FIGS. 6E and 6F would enable the stacked battery structure 100 to have reliable contacts between the via 172 and the current collectors 122, 152A, 152B in the stacked battery structure 100.

Hereinafter, with reference to FIGS. 7A and 7B, variations of stacked battery structure according to one or more exemplary embodiments of the present invention will be described.

In the aforementioned embodiment, there are three battery layers 110, 140A, 140B in the stacked battery structure 100 for a purpose of illustration. However, the number of the battery layers 110, 140 in the stacked battery structure 100 may not be limited to the specific embodiment described hereinabove. In one or more other embodiments, two or more than three battery layers 110, 140 may be stacked to form the stacked battery structure 100.

Figure 7A:
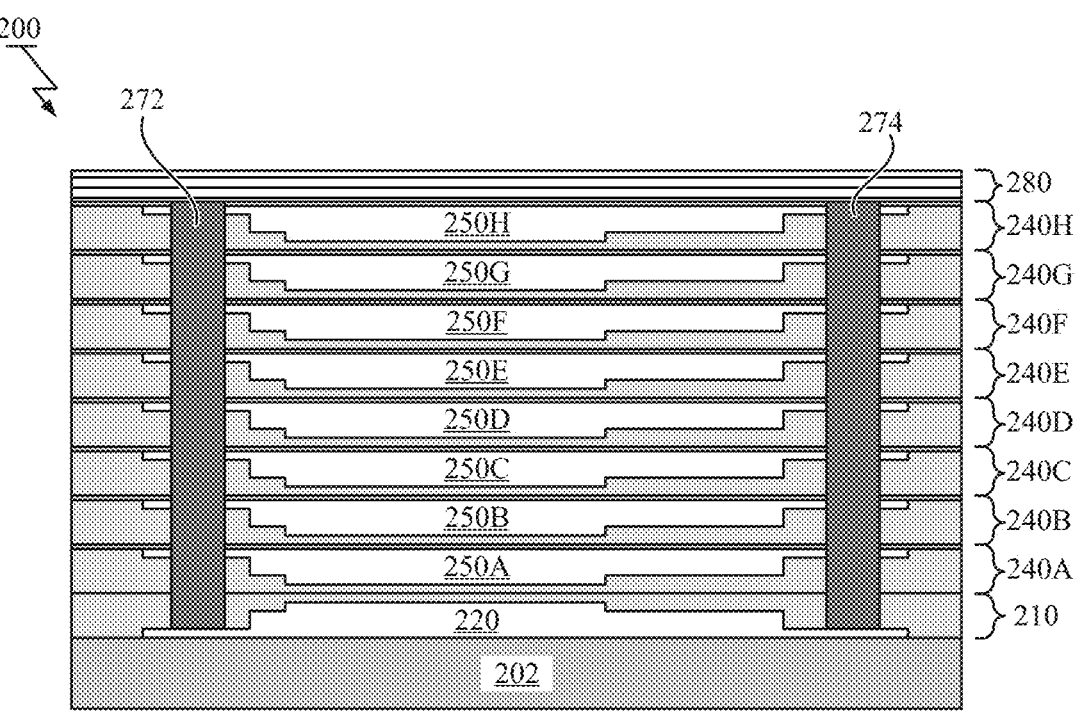
FIGS. 7A and 7B illustrate cross-sectional views of stacked battery structures according to other embodiments of the present invention.

FIG. 7A shows a stacked battery structure 200 having an upward base battery layer 210 and eight downward battery layers 240A~240H, nine battery layers in total stacked on the base substrate 202, each of which has a film battery element 220, 250.

Furthermore, in the aforementioned embodiment, the downward battery layers 140 are described as being formed on the base substrate 102 with the base battery layer 110 interposed therebetween. However, in other embodiments, the downward battery layers 140 may be formed directly on the base substrate 102 without the base battery layer 110 interposed therebetween.

Figure 7B:
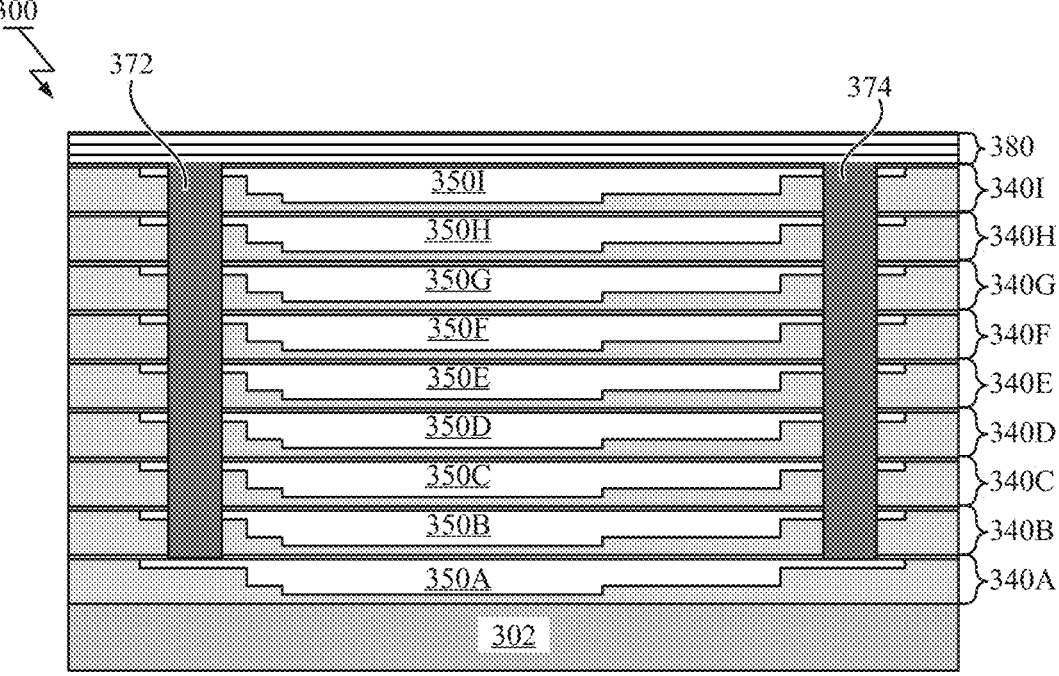

FIG. 7B shows a stacked battery structure 300 having nine downward battery layers 340A~340I stacked on the base substrate 302, each of which has a film battery element 350.

It is necessary to perform merely eight times stacking steps to fabricate the stacked battery structure 200 while it is necessary to perform nine times to fabricate the stacked battery structure 300, thus the stacked battery structure 200 with the base battery layer 210 is more advantageous than the stacked battery structure 300.

Hereinafter, referring to FIGS. 8A and 8B, schematics of electronic device including a stacked battery structure 100 according to one or more exemplary embodiments of the present invention will be described. The electronic device can be used for an IoT device.

Figures 8A, 8B:
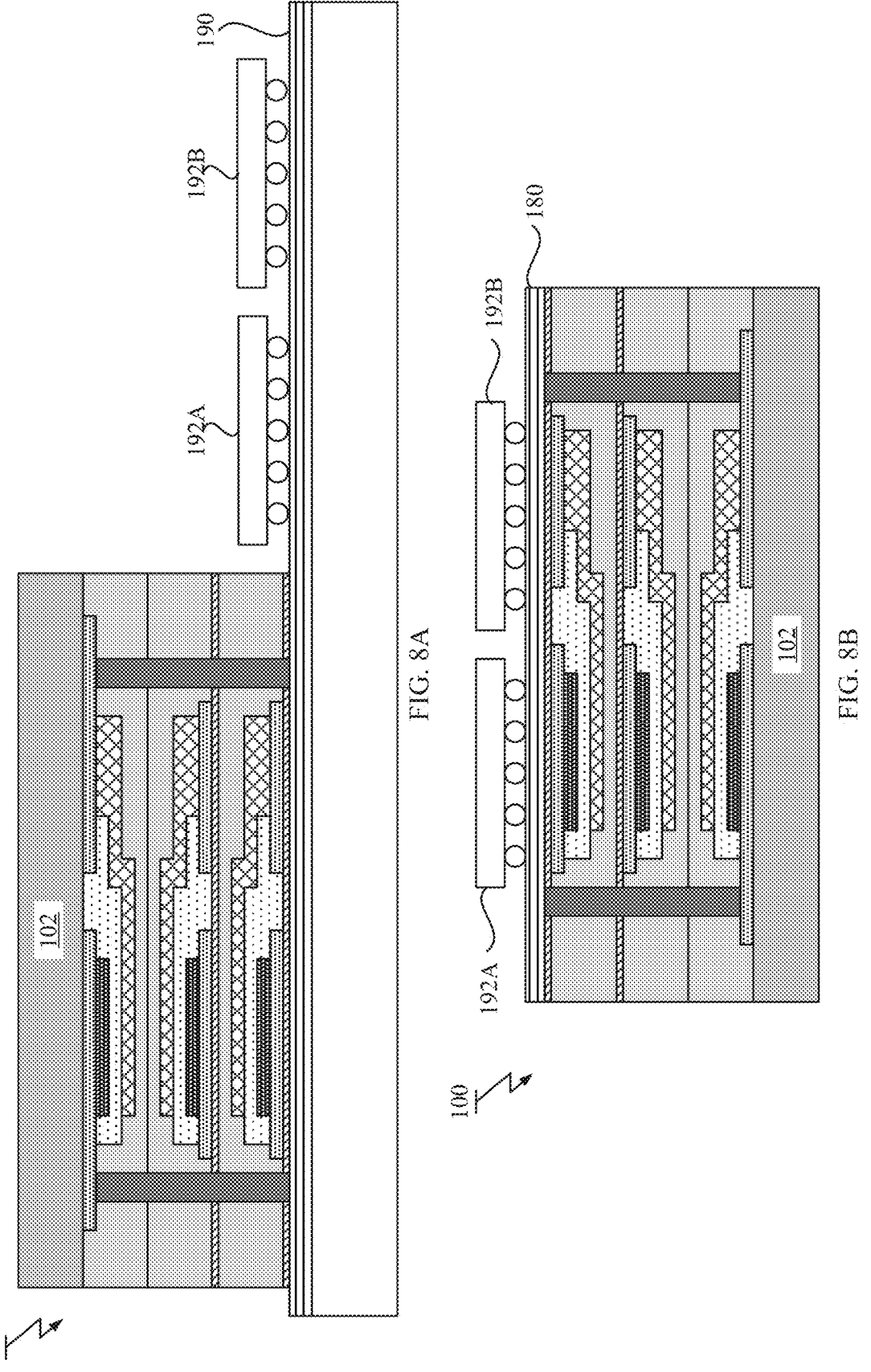
FIGS. 8A and 8B depict electronic devices including a stacked battery structure according to one or more exemplary embodiments of the present invention.

FIG. 8A depicts a schematic of a system-on-package configuration for an electronic device that includes the stacked battery structure 100. As shown in FIG. 8A, the stacked battery structure 100 may be mounted on a wiring substrate 190 on which one or more external electronic components 192A, 192B such as a processor, memory, sensor are mounted.

FIG. 8B depicts a schematic of system-on-battery configuration for an electronic device that includes the stacked battery structure 100. As shown in FIG. 8B, the stacked battery structure 100 works as an interposer or substrate onto which one or more electronic components 172A, 172B are mounted. In this embodiment, the stacked battery structure 100 has the wiring layer 180 on the top surface of the stacked battery layers 110, 140A, 140B for connecting the stacked battery structure 100 with one or more electronic components mounted on the stacked battery structure 100. The system-on-battery configuration may be advantageous for further miniaturization.

Since a power source of the electronic device has a small footprint, an overall size of the electronic device can be miniaturized.

According to one or more embodiments of the present invention, the total thickness of the battery structure can be thinned while maintaining its capacity, or alternatively, the capacity of the battery structure can be enlarged while keeping total thickness of the battery structure.

Figures 9A, 9B:
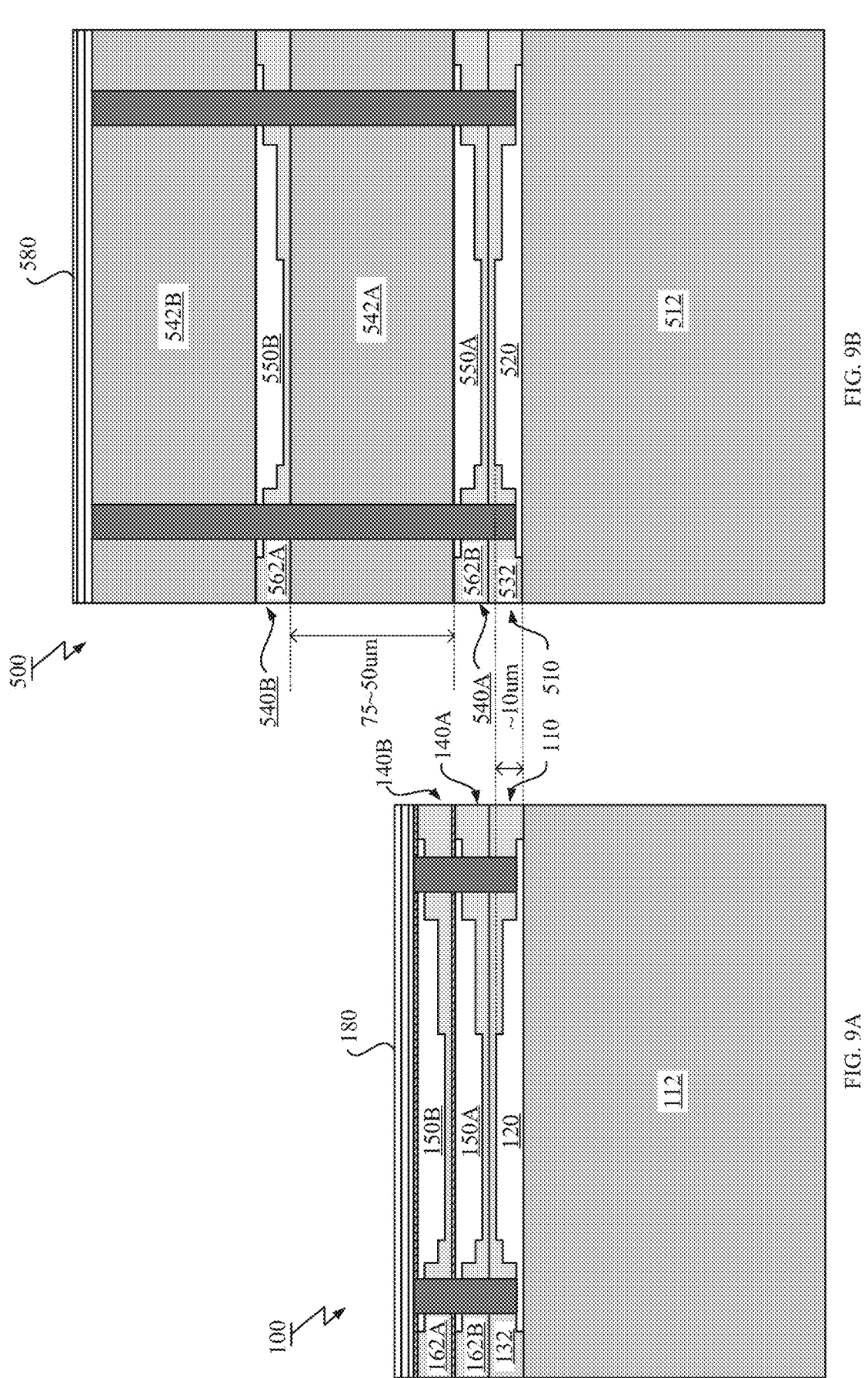
FIGS. 9A and 9B describe a comparison between stacked battery structures with and without applying a novel support substrate removal process according to exemplary embodiments of the present invention.

Referring to FIGS. 9A and 9B, a comparison between stacked battery structures with and without applying the novel support substrate removal process according to the exemplary embodiment of the present invention is described.

FIG. 9A and FIG. 9B show stacked battery structures having three battery layers without and with an intermediate substrate. The stacked battery structure shown in FIG. 9A has one base battery layer 110 and two battery layers 140A, 140B, in which the support substrates 142A, 142B used to support the film battery element 150A, 150B during the fabrication process have been completely eliminated by the novel support substrate removal process. On the other hand, the stacked battery structure 500 shown in FIG. 9B also has one base battery layer 510 and two battery layers 540A, 540B, in which the substrates 542A, 542B where the film battery element 550A, 550B is formed on is still present in the final structure 500.

As described above, even though the substrates 542A, 542B can be thinned down to 75 to 50 um by a standard back grinding process, the thickness of the substrates 542A, 542B is still several times thicker than the thickness of the film battery element 520, 550A, 550B that may be less than or equal to about ten micrometers (~10 um).

As shown in FIG. 9B, there are alternating insulators 562 and substrates 542 in the stacked battery structure 500. Thus, the insulator 562 needs to be removed before stacking, which may uses a pre-patterning process by photolithography to make a hole in the insulator 562. Also, anisotropic dry etching process is needed to drill the substrate 542 after stacking, which may be silicon. Both of the pre-patterning process and the anisotropic dry etching process are expensive processes. Thus, the cost of drilling the via hole increases.

In contrast to the battery structure with the intermediate substrate 542 shown in FIG. 9B, the stacked battery structure 100 according to the one or more embodiments of the present invention, can have thinner total thickness while maintaining its capacity since the support substrate 142 which the film battery element 150 is formed on can be thinned, or preferably eliminated while protecting the film battery element 150 by the protection layer 144. In other words, the stacked battery structure can have a large capacity while keeping total thickness of the battery structure. Since the thickness to be increased by stacking one unit of the battery layer is small, it is possible to increase the number of battery layers stacked within a certain thickness and certain volume. Thus, it can be said it is volume efficient.

In the aforementioned embodiments, stacked structures having multiple thin film battery elements have been described. However, one or more embodiments according to the present invention are not limited to the stacked structures having multiple thin film battery elements, and are also directed to a method for fabricating a stacked structure, in which highly integrated device structure having a multiple devices, that is other than the battery can be achieved in a novel manner.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, steps, layers, elements, and/or components, but do not preclude the presence or addition of one or more other features, steps, layers, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for fabricating a stacked battery structure, the method comprising:

preparing a base substrate;

preparing a battery layer formed on a support substrate, the battery layer including a protection layer formed on the support substrate, a film battery element formed on the protection layer and an insulator covering the film battery element;

placing the battery layer onto the base substrate with the bottom of the support substrate facing up; and removing the support substrate from the battery layer at least in part by etching with an etchant while protecting the film battery element by the protection layer that works as an etch stopper against the etchant.

2. The method of claim 1, wherein the method further comprises, until a desired number of the battery layers is stacked, alternately repeating:

stacking an additional battery layer formed on one other support substrate with the bottom of the other support substrate facing up, the additional battery layer including a protection layer, a film battery element and an insulator; and removing the other support substrate from the additional battery layer at least in part by etching.

3. The method of claim 2, wherein the film battery element in each battery layer includes current collectors and a battery cell in contact with the current collectors, the method further comprising:

forming a via hole in the battery layers stacked on the base substrate to extend through at least one layer to a layer under the at least one layer, wherein the support substrates down to the layer have been eliminated by the etching; and filling a conductive material in the via hole or depositing a conductive material on an inner surface of the via hole to form a conductive path electrically connected to at least one current collector in the battery layers.

4. The method of claim 3, wherein forming the via hole comprises:

drilling at least one protection layer and at least one insulator in the battery layers by laser processing while leaving the current collector.

5. The method of claim 4, wherein the via hole has plural sections and the plural sections have at least one horizontal dimension enlarged from bottom to top in the battery layers and overlap each other in a horizontal plane with respect to the base substrate, the conductive path has contacts with plural current collectors in different battery layers, each contact being obtained at a surface of each of the plural current collectors.

6. The method of claim 3, wherein the method further comprises;

building a wiring layer on the top of the battery layers, the wiring layer including a conductive pattern connecting the conductive path with an external terminal.

7. The method of claim 1, wherein removing the support substrate comprises;

wet-etching the support substrate until reaching the protection layer.

8. The method of claim 7, wherein the support substrate is made of glass material, the wet-etching includes etching using buffered hydrofluoric acid solution, and the base substrate is made of a material having resistance against the buffered hydrofluoric acid solution.

9. The method of claim 1, wherein the base substrate is provided with a base battery layer formed thereon, the base battery layer including a film battery element formed on the base substrate and an insulator covering the film battery element formed on the base substrate, the battery layer being placed onto the insulator of the base battery layer in placing the battery layer onto the base substrate.

10. A method for fabricating a stacked structure, the method comprising:

preparing a base substrate;

preparing a device element layer formed on a support substrate, the device element layer including a protection layer formed on the support substrate, a device element formed on the protection layer and an adhesive material covering the device element;

placing the device element layer onto the base substrate with the bottom of the support substrate facing up; and etching the support substrate from the bottom of the support substrate with an etchant until reaching the protection layer of the device element layer, which works as an etch stopper against the etchant.

11. The method of claim 10, wherein the method further comprises, until a desired number of the device element layers is stacked, alternately repeating:

stacking an additional device element layer formed on other support substrate with the bottom of other support substrate facing up; and removing the other support substrate from the additional device element layer by etching.

12. The method of claim 10, wherein the method further comprises, until a desired number of the battery layers is stacked, alternately repeating:

stacking an additional battery layer formed on one other support substrate with the bottom of the other support substrate facing up, the additional battery layer including a protection layer, a film battery element and an insulator; and removing the other support substrate from the additional battery layer at least in part by etching.

13. The method of claim 12, wherein the device element in each device element layer includes current collectors and a battery cell in contact with the current collectors, the method further comprising:

forming a via hole in the battery layers stacked on the base substrate to extend through at least one layer to a layer under the at least one layer, wherein the support substrates down to the layer have been eliminated by the etching; and filling a conductive material in the via hole or depositing a conductive material on an inner surface of the via hole to form a conductive path electrically connected to at least one current collector in the battery layers.

14. The method of claim 13, wherein forming the via hole comprises:

drilling at least one protection layer and at least one insulator in the battery layers by laser processing while leaving the current collector.

15. The method of claim 14, wherein the via hole has plural sections and the plural sections have at least one horizontal dimension enlarged from bottom to top in the battery layers and overlap each other in a horizontal plane with respect to the base substrate, the conductive path has contacts with plural current collectors in different battery layers, each contact being obtained at a surface of each of the plural current collectors.

16. The method of claim 13, wherein the method further comprises:

building a wiring layer on the top of the battery layers, the wiring layer including a conductive pattern connecting the conductive path with an external terminal.

17. The method of claim 10, wherein the support substrate is made of glass material, the etching includes etching using buffered hydrofluoric acid solution, and the base substrate is made of a material having resistance against the buffered hydrofluoric acid solution.

18. The method of claim 10, wherein the base substrate is provided with a base battery layer formed thereon, the base battery layer including a film battery element formed on the base substrate and an insulator covering the film battery element formed on the base substrate, the battery layer being placed onto the insulator of the base battery layer in placing the battery layer onto the base substrate.

19. A method for fabricating a stacked battery structure, the method comprising:

preparing a base substrate;

preparing a battery layer formed on a glass substrate, the battery layer including an etch stopper layer formed on the support substrate, a film battery element formed on the etch stopper layer and an insulator covering the film battery element;

placing the battery layer onto the base substrate with the bottom of the glass substrate facing up; and removing the glass substrate from the battery layer at least in part by etching with an etchant while protecting the film battery element against the etchant by the etch stopper layer.

20. The method of claim 19, wherein the method further comprises, until a desired number of the battery layers is stacked, alternately repeating:

stacking an additional battery layer formed on one other glass substrate with the bottom of the other glass substrate facing up, the additional battery layer including a protection layer, a film battery element and an insulator; and removing the other glass substrate from the additional battery layer at least in part by etching.

\* \* \* \* \*